US010868729B2

(12) United States Patent
Van Alstyne et al.

(10) Patent No.: US 10,868,729 B2
(45) Date of Patent: *Dec. 15, 2020

(54) SYSTEM AND METHOD FOR AUTOMATICALLY DETERMINING THE OPTIMAL TOPOLOGY FOR MULTIPLE NETWORKED DEVICES

(71) Applicant: Knight Point Systems, Inc., Reston, VA (US)

(72) Inventors: Kenneth Van Alstyne, Reston, VA (US); Roy Keene, Reston, VA (US)

(73) Assignee: Knight Point Systems, LLC, Reston, VA (US)

( * ) Notice: Subject to any disclaimer, the term of this patent is extended or adjusted under 35 U.S.C. 154(b) by 124 days.

This patent is subject to a terminal disclaimer.

(21) Appl. No.: 16/177,720

(22) Filed: Nov. 1, 2018

(65) Prior Publication Data

US 2019/0334780 A1 Oct. 31, 2019

Related U.S. Application Data

(63) Continuation-in-part of application No. 15/457,966, filed on Mar. 13, 2017, now Pat. No. 10,122,587.

(60) Provisional application No. 62/308,337, filed on Mar. 15, 2016.

(51) Int. Cl.
*H04L 12/24* (2006.01)
*H04L 12/803* (2013.01)
*H04L 12/709* (2013.01)
*H04L 12/931* (2013.01)
*H04L 29/08* (2006.01)

(52) U.S. Cl.
CPC ............ *H04L 41/12* (2013.01); *H04L 45/245* (2013.01); *H04L 47/125* (2013.01); *H04L 49/70* (2013.01); *H04L 67/10* (2013.01)

(58) Field of Classification Search
CPC ..... H04L 41/12; H04L 45/245; H04L 47/125; H04L 49/70; H04L 67/10
USPC ................... 370/351, 389, 400, 401
See application file for complete search history.

(56) References Cited

U.S. PATENT DOCUMENTS

| 7,787,370 B1 | 8/2010 | Aweya et al. |
| 7,855,957 B2 | 12/2010 | Madhi et al. |
| 7,881,230 B2 | 2/2011 | Vinayagam et al. |
| 8,004,968 B2 | 8/2011 | Sajassi et al. |
| 8,136,832 B2 | 3/2012 | Hu |
| 8,386,593 B1 | 2/2013 | Gao et al. |

(Continued)

*Primary Examiner* — Obaidul Huq
(74) *Attorney, Agent, or Firm* — Law Offices of John J. Skinner, Jr.; John J. Skinner, Jr.

(57) ABSTRACT

A system and computer implemented method for optimizing network topology in a network comprises a memory unit to store a set of program modules and a processor to execute the set of program modules. A connection detection module is configured to identify a set of network endpoints connected to a network host via Ethernet connections. Further, an input module identifies at least one datagram among the plurality of datagrams received from the network endpoints. The at least one datagram is received from at least one network interface among the plurality of network interfaces. The input module classifies the at least one network interface into at least one of a compute node and a storage node. An optimizer module optimizes the network host, to function with the at least one network interface in one of a first mode, a second mode, and a third mode.

14 Claims, 3 Drawing Sheets

(56) References Cited

U.S. PATENT DOCUMENTS

| | | |
|---|---|---|
| 9,013,986 B2 | 4/2015 | Yu et al. |
| 9,219,701 B2 | 12/2015 | Yu et al. |
| 9,270,524 B2 | 2/2016 | Zhang et al. |
| 9,461,928 B2 | 10/2016 | Zhang et al. |
| 9,553,789 B2 | 1/2017 | Ganapathy et al. |
| 9,660,901 B2 | 5/2017 | Sivasankar et al. |
| 9,781,001 B2 | 10/2017 | Ashwood-Smith |
| 9,906,412 B2 | 2/2018 | Guo et al. |
| 10,419,239 B2 | 9/2019 | Butcher et al. |
| 2014/0189094 A1* | 7/2014 | Ditya ............... H04L 45/245 709/224 |
| 2015/0163100 A1* | 6/2015 | Graf ............... H04L 43/12 370/255 |
| 2015/0163108 A1 | 6/2015 | Wong et al. |
| 2015/0215209 A1 | 7/2015 | Pirko |
| 2015/0381410 A1 | 12/2015 | Strassner |
| 2016/0212056 A1 | 7/2016 | Grosso et al. |
| 2017/0289018 A1 | 10/2017 | Iyer et al. |

\* cited by examiner

SYSTEM AND METHOD FOR AUTOMATICALLY DETERMINING THE OPTIMAL TOPOLOGY FOR MULTIPLE NETWORKED DEVICES

CROSS REFERENCE TO APPLICATION

This patent application is a continuation-in-part of U.S. application Ser. No. 15/457,966, filed Mar. 13, 2017, which claims the benefit of U.S. Provisional Application No. 62/308,337 filed on Mar. 15, 2016. The above applications are both incorporated by reference herein in their entireties.

FIELD OF THE INVENTION

The present invention relates to a system and method for automatically determining the optimal topology for multiple networked devices, and, more particularly, to a method and apparatus for an automated system which allows for optimal incorporation of different types of devices into a computer cloud-based network.

BACKGROUND OF THE INVENTION

In a system of networked devices where the physical connection of a device automatically results in its' provisioning, there is no manual install step, and therefore, no opportunity for manual configuration of an optimal network topology. This results in a need for a methodology to automatically determine the optimal topology for those network configurations upon initial provisioning. This same problem exists when changes to the networked devices, such as plugging in new network cards/drivers, occur—provisioning is automated and thus requires real-time determinations of optimal network configurations by the system. Therefore, there is a need in the art for a system and method for optimizing network topology in a network.

SUMMARY OF THE INVENTION

Accordingly, the present invention is directed to providing a method and apparatus to automatically determine and configure an optimal network topology in a system of networked devices. The developed methodology determines whether a Link Aggregation Control Protocol (LACP) datagram should be used or not, and if not, then what protocol type should be used instead. In order to accomplish such, the system first must collect a list of all interfaces of the newly connected or newly changed devices connected to the network. This all-inclusive list must then be filtered to remove any virtual, or non-Ethernet, interfaces since these interfaces have no relevance to the physical network the devices are connected to. Once filtered, a decision tree is implemented by the system to ensure the most optimal network configuration is chosen and then implemented. The decision tree first checks for existence of bonding mode kernel boot parameter. If the bonding mode boot parameter exists and if the bonding mode is non-LACP, user-configured boding mode is selected. Thus, the present invention allows to optimize network topology based on user configured bonding policy modes of Linux bonding. The bonding policy modes includes, but not limited to, different policy modes such as 'balance-round robin policy' called as Mode "rr", 'active-backup policy' called as Mode "ab", 'balance-XOR policy' called as Mode "xor", 'broadcast' called as Mode "broadcast", 'IEEE standard 802.3ad (LACP)' called as Mode "lacp" or "1", 'transmit load balancing' called as Mode "tlb" or "2" and 'adaptive load balancing' called as Mode "alb" or "3". In another embodiment, if the bonding mode boot parameter is not set or if the set boding mode is an LACP, the decision tree listens for LACP datagrams on each interface. If LACP datagrams are received, the system optimizes for it in what is called "mode 1". If no LACP datagrams are received, one of the other Linux bonding modes is used. For nodes where LACP is not used and where the interface will be added to a Linux bridge to participate in a virtual switch environment the bonding mode selected is "Transmit Load Balancing" (TLB), what is called "mode 2", otherwise (again, unless LACP is available) the bonding mode selected is "Adaptive Load Balancing" (ALB), what is called "mode 3". The present invention determines whether a Link Aggregation Control Protocol (LACP) datagram should be used or not. As a result, the present invention states whether Link Aggregation Control Protocol (LACP) datagrams are being used by the remote peer/switch or not.

In one embodiment of the present invention, a system for optimizing network topology in a network comprises a memory unit to store a set of program modules and a processor to execute the set of program modules. A connection detection module is configured to identify a set of network endpoints connected to a network host via Ethernet connections. An input module is configured to receive a plurality of datagrams from a plurality of network interfaces between the network host and each of the set of network endpoints. The input module checks for existence of bonding mode kernel boot parameter. Further, the input module identifies at least one datagram among the plurality of datagrams, as one of a Link Aggregation Control Protocol (LACP) datagram and a non-LACP datagram. The at least one datagram is received from at least one network interface among the plurality of network interfaces. If an absence of LACP datagram is detected among the plurality of datagrams, then the input module classifies the at least one network interface into at least one of a compute node and a storage node. An optimizer module optimizes the network host, to function with the at least one network interface in a first mode, based on the at least one datagram being the LACP datagram. The optimizer module optimizes, the network to function with at least one network interface in a second mode, based on the at least one network interface being the storage node. The optimizer module optimizes, the network host to function with the at least one network, based on the at least one network interface being the compute node. The optimizer module optimizes, the network to function with at least one network interface in a user configured bonding mode, based on the set bonding mode kernel boot parameter being a non-LACP mode.

In one embodiment of the present invention, in the first mode, the at least one network interface functions in accordance with LACP protocol. In the third mode, the at least one network interface participates in a virtual switch environment with an Adaptive load balancing Linux bonding mode implemented in a Linux bridge. In the second mode, the at least one network interface participates in a virtual switch environment with a transmit load balancing Linux bonding mode. The input module is further configured to collect a list of the plurality of network interfaces connected to the network host. The input module is further configured to operate in a network listen mode. The input module listens to datagrams from the at least one network interface.

In yet another embodiment of the present invention, a computer-implemented method of optimizing network topology in a network comprises identifying, by a processor via a connection detection module, a set of network endpoints connected to a network host via Ethernet connections. Further, the method comprises receiving, by the processor via an input module, a plurality of datagrams from a plurality of network interfaces between the network host and each of the set of network endpoints. Further, the method comprises checking, at the processor via the input module, for existence of bonding mode kernel boot parameter. Further, the method comprises identifying, by the processor via the input module, at least one datagram among the plurality of datagrams, as one of a Link Aggregation Control Protocol (LACP) datagram and a non-LACP datagram wherein the at least one datagram is received from at least one network interface among the plurality of network interfaces. If an absence of LACP datagram is detected among the plurality of datagrams, then the processor via the input module, classifies the at least one network interface into at least one of a compute node and a storage node, based on the at least one datagram being a non-LACP datagram. Further, the method comprises optimizing, by the processor via an optimizer module, the network host, to function with the at least one network interface in a first mode, based on the at least one datagram being the LACP datagram. Further, the method comprises optimizing, by the processor via the optimizer module, the network host to function with at least one network interface in a second mode, based on the at least one network interface being the storage node. Further, the method comprises optimizing, by the processor via the optimizer module, the network host to function with the at least one network, based on the at least one network interface being the compute node. Further, the method comprises optimizing, by the processor via the optimizer module, the network host to function with the at least one network interface in a user-configured bonding mode, based on the set bonding mode boot parameter being a non-LACP mode.

The present invention, including its features and advantages, will become more apparent from the following detailed description with reference to the accompanying drawings.

DETAILED DESCRIPTION

A description of embodiments of the present invention will now be given with reference to the Figures. It is expected that the present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope. The present invention relates to a system and method for optimizing network topology in a network.

Figure 1:
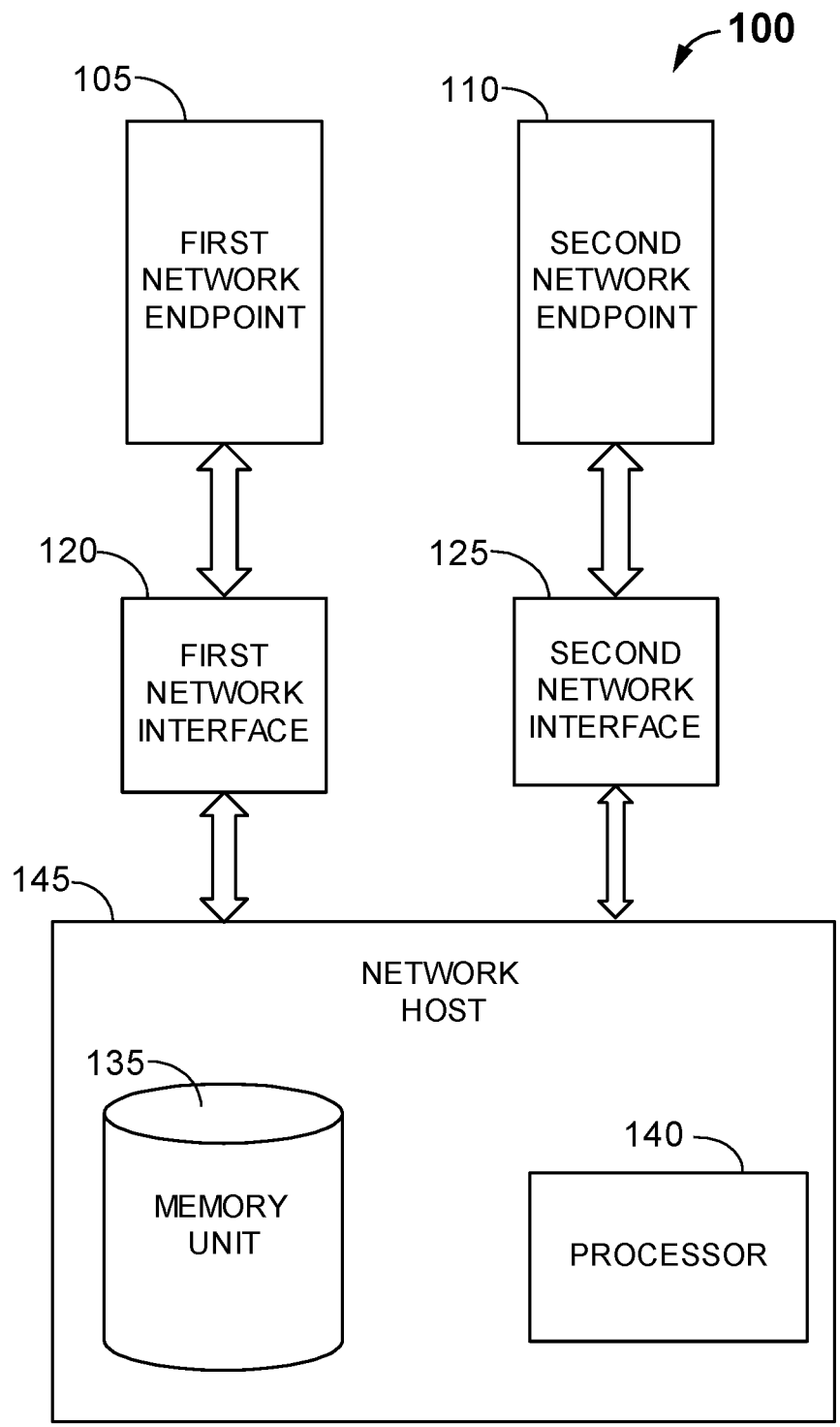
FIG. 1 is a block diagram of an environment implemented in accordance with various embodiments of the invention.

FIG. 1 is a block diagram of an environment 100 in accordance with which various embodiments of the present invention are implemented. The environment 100 comprises a first network endpoint 105, a second network endpoint 110, and a network host 145. In one example, the first network endpoint 105 and the second network endpoint 110 are at least one of tablet computers, personal computers, smart phones, smart televisions, printers, fax machines, scanners, servers, virtual machines, and laptops. The network host 145 is connected to the first network endpoint 105 and the second network endpoint 110 via a first network interface 120, a second network interface 125, respectively. In one example, at least one network interface among the first network interface 120, the second network interface 125 are Ethernet connections. In one example, at least one network interface among the first network interface 120 and the second network interface 125 are Ethernet connections. In another example, at least one network interface among the first network interface 120 and the second network interface 125 is one of a virtual connection and a non-ethernet connection. In another example, at least one network interface among the first network interface 120 and the second network interface 125 is a storage node. In one example, at least one network interface among the first network interface 120 and the second network interface 125 is a compute node. The first network interface 120 and the second network interface 125, enable communication between the first network endpoint 105 and the second network endpoint 110 and the network host 145. In one example, the network host 145 comprises a memory unit 135 and a processor 140. A block diagram of an exemplary implementation of the network host 145 of FIG. 1 is illustrated in FIG. 2.

Figure 2:
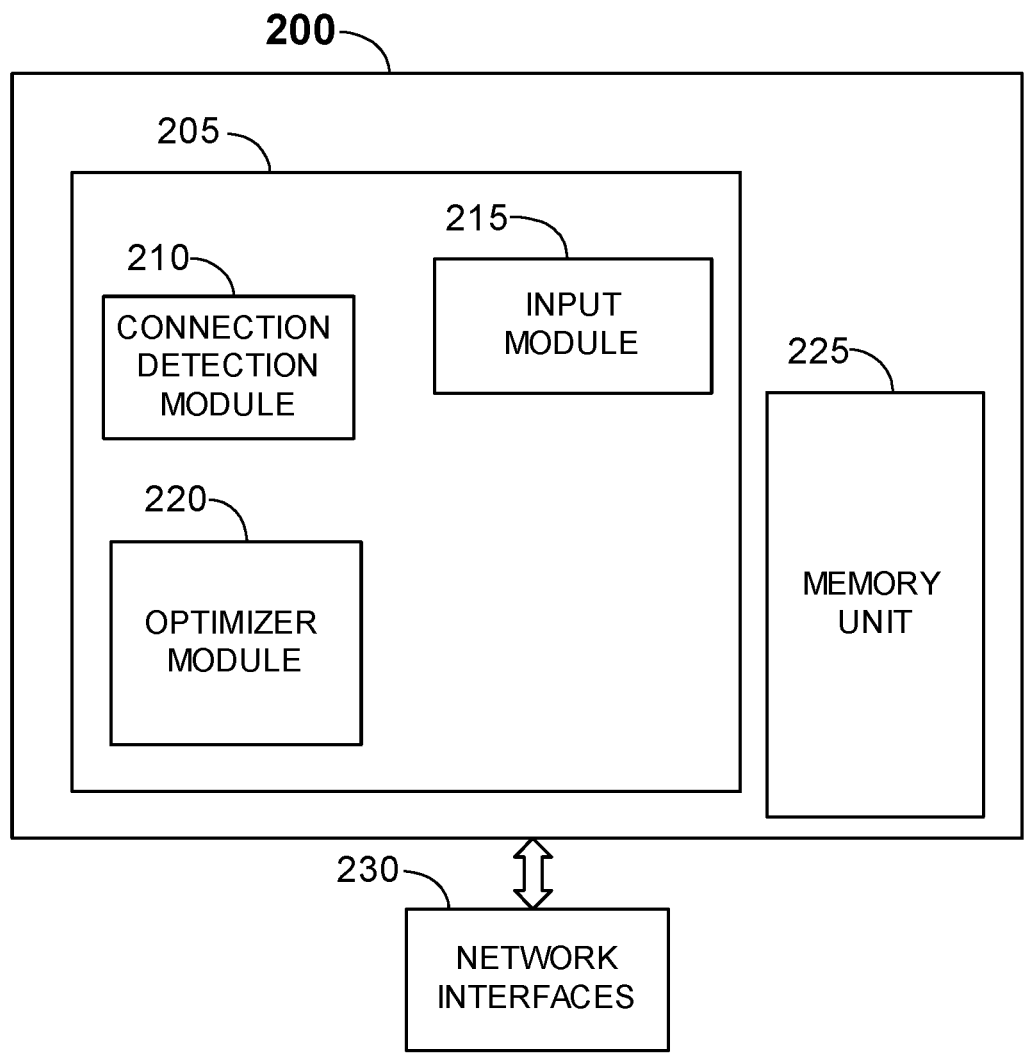
FIG. 2 is a block diagram of a network host in accordance with various embodiments of the invention.

Referring to FIG. 2, a network host 200 comprises a memory unit 225 to store a set of program modules and a processor 205 to execute the set of program modules. The set of program modules comprises a connection detection module 210, an input module 215, and an optimizer module 220. In one example, the network host 200 is connected to a plurality of network endpoints (not shown) in a network (not shown) via a plurality of network interfaces 230. In one example, multiple network endpoints among the plurality of network endpoints are connected to the network host 200 via Ethernet connections. In another example, multiple network devices among the plurality of network endpoints are connected to the network host 200 via virtual connections and non-Ethernet connections. The connection detection module 210 is configured to identify a set of network endpoints (not shown) connected to the network host 200 via Ethernet connections. In one example, the connection detection module 210 is configured to identify a set of physical network interfaces among the plurality of network interfaces 230. The connection detection module 210 transmits information regarding the set of network endpoints to the input module 215. In one example, the input module 215 collects a list of all physical network interfaces among the plurality of network interfaces 230. As will be made clear from the below description, the list allows the network host 200 to configure the network based on physical implementation detection. The input module 215 is further configured to operate in a network listen mode. The input module 215 listens to datagrams from the set of network endpoints. In one example, the input module 215 listens to datagrams from the physical network interfaces among the plurality of network interfaces. As a result, the network host 200 is enabled to operate on any number of ports on the plurality of network endpoints. The input module 215 is configured to receive a plurality of datagrams from the plurality of network interfaces 230 between the network host 200 and each of the set of network endpoints. Further, the input module 215 identifies at least one datagram among the plurality of datagrams, as one of a Link Aggregation Control Protocol (LACP)

datagram and a non-LACP datagram. As is well understood in the art, LACP datagrams are being sent from the set of network endpoints capable of network communication. Indeed, IEEE standard 802.3ad is incorporated herein by reference to extent information and/or understanding is needed for such link aggregation and/or communication schemes. Utilizing such, the network host 200 is able to determine what is to be done with an LACP datagram if it is received and what is done if no LACP datagrams are received in a given time period. If such LACP datagrams are received, a determination of what "mode" to use is made on the node (not switch) side, essentially then adapting to network configuration conditions.

The at least one datagram identified by the input module 215 is received from at least one network interface among the plurality of network interfaces 230. If an absence of LACP datagrams is detected in the datagrams received, then the input module 215 classifies the at least one network interface into at least one of a compute node and a storage node, based on the at least one datagram being a non-LACP datagram. This allows for support of multiple non-LACP-based bonding methods in addition to an LACP-based bonding mechanism that works irrespective of physical/virtual differentiation. The input module 215 transmits information regarding the at least one network interface and the at least one datagram to the optimizer module.

The optimizer module 220 optimizes the network host 200, to function with the at least one network interface in a first mode, based on the at least one datagram being the LACP datagram. In one embodiment of the present invention, in the first mode, the at least one network interface functions in accordance with LACP protocol. As a result, if an LACP datagram is received, then the network host 200 determines that the first mode should be used for communications. The at least one network interface is determined, then, to be connected to a network endpoint among the set of network endpoints and hence communication is pursuant to IEEE standard 802.3ad. If the at least one network interface is a storage node, then the optimizer module 220 optimizes, the network host 200 to function with the at least one network interface in a second mode. In the second mode, the at least one network interface participates in a virtual switch environment with a Transmit load balancing Linux bonding mode. If the at least one network interface is a compute node, then the optimizer module 220 optimizes, the network host 200 to function with the at least one network in a third mode. In the third mode, the at least one network interface participates in a virtual switch environment with an Adaptive load balancing Linux bonding mode implemented in a Linux bridge. Hence, the optimizer module 220 dynamically optimizes a network topology of the network.

Figure 3:
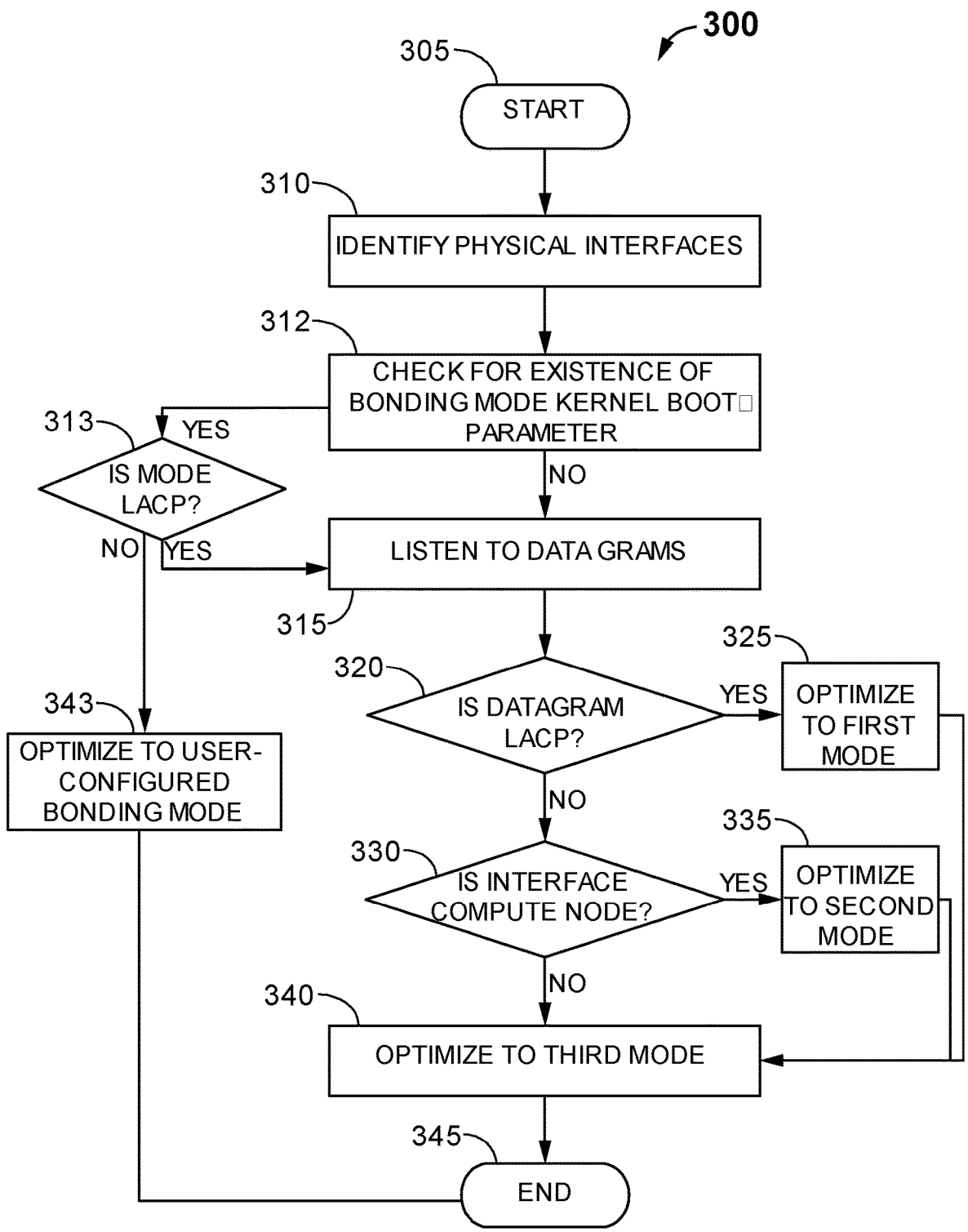
FIG. 3 is flow chart of a computer-implemented method of optimizing network topology in a network, according to yet another embodiment of the present invention.

FIG. 3 is a flow chart illustrating a computer-implemented method 300 of optimizing network topology in a network, according to yet another embodiment of the present invention. The method 300 is implemented in an environment comprising a first network endpoint, a second network endpoint, and a network host. In one example, the first network endpoint and the second network endpoint are at least one of tablet computers, personal computers, smart phones, smart televisions, printers, fax machines, scanners, servers, virtual machines, and laptops. The network host is connected to the first network endpoint and the second network endpoint via a first network interface and a second network interface respectively. In one example, at least one network interface among the first network interface and the second network interface are Ethernet connections. In another example, at least one network interface among the first network interface and the second network interface is one of a virtual connection and a non-Ethernet connection. In one example, at least one network interface among the first network interface and the second network interface is a storage node. In another example, at least one network interface among the first network interface and the second network interface is a compute node. The first network interface and the second network interface enable communication between the first network endpoint, the second network endpoint, and the network host. In one example, the network host comprises a memory unit and a processor. The memory unit stores a set of program modules and the processor executes the set of program modules. The set of program modules comprises a connection detection module, an input module, and an optimizer module. In one example, the network host is connected to a plurality of network endpoints in a network via a plurality of network interfaces. The method 300 commences at step 305.

At step 310, the processor, via the connection detection module identifies a set of network endpoints connected to the network host via Ethernet connections. In one example, the connection detection module is configured to identify a set of physical network interfaces among the plurality of network interfaces. The connection detection module transmits information regarding the set of network endpoints to the input module. In one example, the input module collects a list of all physical network interfaces among the plurality of network interfaces. As will be made clear from the below description, the list allows the network host to configure the network based on physical implementation detection.

A step 312, the input module checks for existence of bonding mode kernel boot parameters. If the bonding mode kernel boot parameters is set or exists, the method 300 proceeds to step 313. Otherwise, if bonding mode kernel boot parameters is not set, the method 300 proceeds to step 315.

At step 313, the processor identifies the bonding mode boot parameter being link aggregation control protocol (LACP) mode and non-LACP mode. If the processor bonding mode kernel boot parameters being a non-LACP mode, the method 300 proceeds to step 343.

At step 315, the input module operates in a network listen mode. The input module listens to datagrams from the set of network endpoints. In one example, the input module listens to datagrams from the physical network interfaces among the plurality of network interfaces. As a result, the network host is enabled to operate on any number of ports on the plurality of network endpoints. The input module is configured to receive a plurality of datagrams from the plurality of network interfaces between the network host and each of the set of network endpoints.

At step 320, the processor via the input module identifies at least one datagram among the plurality of datagrams, as one of a LACP datagram and a non-LACP datagram. The at least one datagram identified by the input module is received from at least one network interface among the plurality of network interfaces. As is well understood in the art, LACP datagrams are being sent from the set of network endpoints capable of network communication. Indeed, IEEE standard 802.3ad is incorporated herein by reference to extent information and/or understanding is needed for such link aggregation and/or communication schemes. Utilizing such, the network host is able to determine what is to be done with an LACP datagram if it is received and what is done if no LACP datagrams are received in a given time period. If such LACP datagrams are received, a determination of what "mode" to use is made on the node (not switch) side, essentially then adapting to network configuration conditions. The input module transmits information regarding the at least one datagram to the optimizer module. If the at least one datagram is a LACP datagram, the method 300 proceeds to step 325. Otherwise, if an absence of LACP datagram is detected, then the method 300 proceeds to step 330.

At step 325, the optimizer module optimizes the network host, to function with the at least one network interface in a first mode, based on the at least one datagram being the LACP datagram. In one embodiment of the present invention, in the first mode, the at least one network interface functions in accordance with LACP protocol. As a result, if an LACP datagram is received, then the network host determines that the first mode should be used for communications. The at least one network interface is determined, then, to be connected to a network endpoint among the set of network endpoints and hence communication is pursuant to IEEE standard 802.3ad.

At step 330 the input module classifies the at least one network interface into at least one of a compute node and a storage node, based on the at least one datagram being a non-LACP datagram. This allows for support of multiple non-LACP-based bonding methods in addition to an LACP-based bonding mechanism that works irrespective of physical/virtual differentiation. If the at least one network interface is the storage node, then the method 300 proceeds to step 340. If the at least one network interface is the compute node, then the method 300 proceeds to step 335.

At step 335, the optimizer module optimizes, the network host to function with the at least one network interface in a second mode. In the second mode, the at least one network interface participates in a virtual switch environment with a transmit load balancing Linux bonding mode.

At step 340, the optimizer module optimizes, the network host to function with the at least one network in a third mode. In the third mode, the at least one network interface participates in a virtual switch environment with an Adaptive load balancing Linux bonding mode implemented in a Linux bridge. Hence, the optimizer module dynamically optimizes a network topology of the network.

At step 343, the processor optimizes the network host to function with the at least one network in a user-configured bonding mode, based on the bonding mode boot parameter being a non-LACP. The present invention enables to optimize network topology based on the user/client mandated configuration of the policy modes of Linux bonding. The bonding policy modes includes, but is not limited to, different policy modes such 'balance-round robin policy' called as Mode "rr", 'active-backup policy' called as Mode "ab", 'balance-XOR policy' called as Mode "xor", 'broadcast' called as mode "broadcast", 'IEEE standard 802.3ad (LACP)' called as Mode "lacp" or "1", 'transmit load balancing' called as Mode "tlb" or "2" and 'adaptive load balancing' called as Mode "alb" or "3". This feature benefits users/clients of KPS in certain scenarios, for example, client hardware limitations, network requirements, etc.

The method 300 ends at step 345.

The foregoing description comprises illustrative embodiments of the present invention. Having thus described exemplary embodiments of the present invention, it should be noted by those skilled in the art that the within disclosures are exemplary only, and that various other alternatives, adaptations, and modifications may be made within the scope of the present invention. Merely listing or numbering the steps of a method in a certain order does not constitute any limitation on the order of the steps of that method. Many modifications and other embodiments of the invention will come to mind to one skilled in the art to which this invention pertains having the benefit of the teachings presented in the foregoing descriptions. Although specific terms may be employed herein, they are used only in generic and descriptive sense and not for purposes of limitation. Accordingly, the present invention is not limited to the specific embodiments illustrated herein.

What is claimed is:

1. A system for optimizing network topology in a network, the system comprising:
   a memory unit to store a set of program modules;
   a processor to execute the set of program modules, wherein the set of program modules comprise:
      a connection detection module, executed by the processor, configured to identify a set of network endpoints connected to a network host via Ethernet connections;
      an input module, executed by the processor, configured to:
         receive a plurality of datagrams from a plurality of network interfaces between the network host and each of the set of network endpoints,
         check existence of bonding mode boot parameter;
         identify at least one datagram among the plurality of datagrams, as one of a Link Aggregation Control Protocol (LACP) datagram and a non-LACP datagram wherein the at least one datagram is received from at least one network interface among the plurality of network interfaces, and
         classify the at least one network interface into at least one of a compute node and a storage node, based on the at least one datagram being a non-LACP datagram; and
      an optimizer module, executed by the processor, configured to:
         optimize the network host, to function with the at least one network interface in a first mode, based on the at least one datagram being the LACP datagram,
         optimize, the network to function with at least one network interface in a second mode, based on the at least one network interface being the storage node,
         optimize, the network host to function with the at least one network interface in a third mode, based on the at least one network interface being the compute node, and
         optimize, the network host to function with the at least one network interface in a user-configured bonding mode, based on the bonding mode boot parameter being non-LACP.

2. The system of claim 1, wherein, in the first mode, the at least one network interface functions in accordance with LACP protocol.

3. The system of claim 1, wherein, in the third mode, the at least one network interface participates in a virtual switch environment with an Adaptive load balancing Linux bonding mode implemented in a Linux bridge.

4. The system of claim 1, wherein, in the second mode, the at least one network interface participates in a virtual switch environment with a Transmit load balancing Linux bonding mode.

5. The system of claim 1, wherein the input module is further configured to collect a list of the plurality of network interfaces connected to the network host.

6. The system of claim 1, wherein the input module is further configured to operate in a network listen mode.

7. The system of claim 6, wherein the input module listens to datagrams from the at least one network interface.

8. A computer implemented method of optimizing network topology in a network, the method comprising:
- identifying, by a processor via a connection detection module, a set of network endpoints connected to a network host via Ethernet connections;
- receiving, by the processor via an input module, a plurality of datagrams from a plurality of network interfaces between the network host and each of the set of network endpoints;
- checking, by the processor via the input module, for existence of bonding mode boot parameter;
- identifying, by the processor via the input module, at least one datagram among the plurality of datagrams, as one of a Link Aggregation Control Protocol (LACP) datagram and a non-LACP datagram wherein the at least one datagram is received from at least one network interface among the plurality of network interfaces;
- classifying, by the processor via the input module, the at least one network interface into at least one of a compute node and a storage node, based on the at least one datagram being a non-LACP datagram;
- optimizing, by the processor via an optimizer module, the network host, to function with the at least one network interface in a first mode, based on the at least one datagram being the LACP datagram;
- optimizing, by the processor via the optimizer module, the network host to function with at least one network interface in a second mode, based on the at least one network interface being the storage node;
- optimizing, by the processor via the optimizer module, the network host to function with the at least one network interface in a third mode, based on the at least one network interface being the compute node; and
- optimizing, by the processor via the optimizer module, the network host to function with the at least one network interface in a user-configured bonding mode, based on the bonding mode boot parameter being non-LACP.

9. The method of claim 8, wherein, in the first mode, the at least one network interface functions in accordance with LACP protocol.

10. The method of claim 8, wherein, in the third mode, the at least one network interface participates in a virtual switch environment with an adaptive load balancing Linux bonding mode implemented in a Linux bridge.

11. The method of claim 8, wherein, in the second mode, the at least one network interface participates in a virtual switch environment with a Transmit load balancing Linux bonding mode.

12. The method of claim 8, wherein the input module is further configured to collect a list of the plurality of network interfaces connected to the network host.

13. The method of claim 8, wherein the input module is further configured to operate in a network listen mode.

14. The method of claim 13, wherein the input module listens to datagrams from the at least one network interface.

* * * * *